United States Patent [19]

Hutter et al.

[11] Patent Number: 5,152,832
[45] Date of Patent: Oct. 6, 1992

[54] WATER-SOLUBLE ROSIN POLYAMIDE RESINS

[75] Inventors: G. Frederick Hutter, Charleston, S.C.; Paul J. LeBlanc, Jacksonville, Fla.

[73] Assignee: Westvaco Corporation, New York, N.Y.

[21] Appl. No.: 723,261

[22] Filed: Jun. 28, 1991

Related U.S. Application Data

[63] Continuation-in-part of Ser. No. 454,416, Dec. 21, 1989, Pat. No. 5,066,331.

[51] Int. Cl.⁵ .............................................. C09D 11/08
[52] U.S. Cl. ...................................... 106/30; 106/230; 106/241; 530/211; 530/221
[58] Field of Search .................. 106/30, 20, 230, 241; 530/211, 221

[56] References Cited

U.S. PATENT DOCUMENTS 4,963,188 10/1990 Parker .................................... 106/20

Primary Examiner—Shrive Beck
Assistant Examiner—Margaret Einsmann
Attorney, Agent, or Firm—Terry B. McDaniel; Daniel B. Reece, IV; Richard L. Schmalz

[57] ABSTRACT

Improved water soluble resins having qualities of adhesion, wettability and improved stability for use in packaging ink compositions are prepared as the reaction products of modified rosin and a compound containing two secondary amine groups, and further modifying said reaction products with a polyol, such as diethylene glycol.

24 Claims, No Drawings

WATER-SOLUBLE ROSIN POLYAMIDE RESINS

This application is a continuation-in-part of application Ser. No 07/454,416, filed Dec. 21, 1989, which issued on Nov. 19, 1991, as U.S. Pat. No. 5,066,331.

BACKGROUND OF THE INVENTION

(1) Field of the Invention

This invention relates to a novel water-soluble resin. In particular, this invention relates to a water-soluble resin for packaging ink, derived from the reaction product of a modified rosin and a bis (secondary amine) such as piperazine.

(2) Description of Prior Art

Resin used as a vehicle for water based packaging ink must exhibit properties such as solubility in water, wet adhesion to polypropylene film, hydrolytic stability, high melting point, and good pigment wetting.

Alcohol soluble polyamide resins have been used extensively in inks for packaging and are commercially available. These polyamides are made from dimerized fatty acids and various polyamines such as ethylene diamine or hexamethylene diamine.

The use of such polyamide resins in ink compositions is described in Floyd, D. E., Polyamide Resins, Reinhold Publishing Co., New York, 1958 and in the Encyclopedia of Polymer Science and Technology, Interscience Publishers, John Wiley Sons, Volume 10, New York, 1969. A typical commercial product is GAX-340 manufactured by Henkel.

For water based ink, a water soluble resin such as acrylic resin or a conventional soluble maleic resin may be used. Acrylic resins have good film properties, but lack adhesion to polyolefin films.

Conventional soluble maleic resins, which contain half-esters, are subject to a certain degree of hydrolytic instability under alkaline conditions. They also lack film toughness.

Water-based ink compositions are disclosed in U.S. Pat. No. 4,963,188 to be prepared by free radical polymerization of rosin and maleic anhydride. Modification of the polymer with an alcohol or an amine prior to utilization in preparing the ink composition is disclosed.

Recently, water soluble resins having qualities of adhesion and wettability for use in packaging ink compositions were developed as the reaction products of rosin modified by Diels-Alder reaction with an $\alpha, \beta$ unsaturated acid and a compound containing two secondary amine groups, including commercially available piperazine and N,N'-dimethylethylene diamine. These resins are described in parent application Ser. No. 454,416, now patent number 5,066,331.

These resins were developed primarily for use in water/isopropanol-based inks for printing on film, where they perform quite satisfactorily. When using these resins in all-water systems (i.e., no alcohol), it was found that the resin solutions had relatively limited shelf stability. In many cases the solutions gel upon standing for two or three days.

It is therefore an object of this invention to provide improved water soluble resins having qualities of adhesion, wettability and improved stability for us in packaging ink compositions.

SUMMARY OF THE INVENTION

The above object is met by a novel resin derived from the reaction products of modified rosin and a compound containing two secondary amine groups, and further modifying said reaction products with a polyol, such as diethylene glycol.

DESCRIPTION OF THE PREFERRED EMBODIMENT

Rosin is mainly a mixture of $C_{20}$, fused-ring, monocarboxylic acids, typified by levopimaric and abietic acids, both of which are susceptible to numerous chemical transformations. The rosins to which this invention relates include gum rosin, wood rosin, and tall oil rosin.

It is generally known in the art that $\alpha, \beta$-unsaturated acids and their anhydrides, such as maleic acid, maleic anhydride, itaconic acid, itaconic anhydride, and fumaric acid may be reacted with abietic type rosin acids to yield $C_{24}$ or $C_{25}$ polycyclic tricarboxylic acids and anhydrides. Examples include the reaction product of levopimaric acid reacted with fumaric acid, i.e., fumaropimaric acid (I) and the product of levopimaric acid reacted with maleic anhydride, i.e., maleopimaric acid anhydride (II), as described in Kirk-Othmer, *Encyclopedia of Chemical Technology*, 3rd Edition, Vol. 20, Wiley-Inter-Science Publications, John Wiley & Sons, New York, 1978:

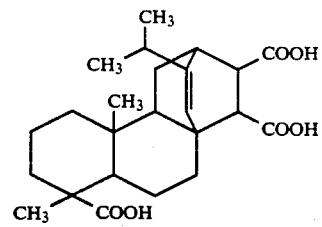

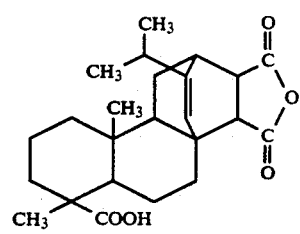

The water soluble resin of the present invention is produced by reacting such a maleated or fumarated rosin acid with a compound containing two secondary amine groups, followed by reaction with a polyol.

Generally, the polyamine may be any polyamine of the general form:

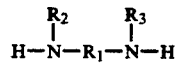

where $R_1$ = alkylene and $R_2$ and $R_3$ are alkyl or where $R_1$ = alkylene, $R_2 + R_3$ = alkylene and $R_1$, $R_2$, and $R_3$, together with the two nitrogens to which they are bonded, form a nitrogen-containing heterocyclic ring system. Preferably, the compound containing two secondary amine groups may be a linear polyamine, such as N,N'-dimethylethylene diamine, or a cyclical polyamine, such as piperazine.

The nitrogens of the compound containing 2 secondary amine groups react with the secondary carboxyls of the maleated or fumarated resin to form a linear oligomer with tertiary amide groups:

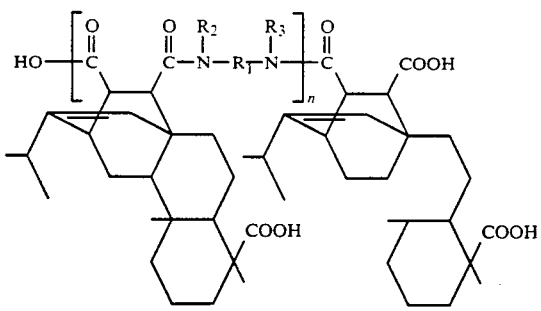

III where n = a positive integer and preferably n=2 or 3.

Use of secondary amines, rather than primary amines which would react with modified rosin in a similar way, is an essential aspect of this invention because of the lower viscosity thereby obtained. A primary amine reacted with a modified rosin forms either an imide, which has greater molecular rigidity, or a secondary amide, which is subject to interchain hydrogen bonding.

The reaction should be carried out at a relatively low temperature (below about 235° C., preferably about 200° C.) so that reaction of the secondary carboxyls of the rosins is favored over the tertiary ones and to avoid chain branching. Since rosin typically cannot be fully maleated or fumarated, resin made by the above process will contain a certain amount of unreacted rosin, which acts as a plasticizer and reduces the softening point of the resin. The softening point can be increased either by using a rosin that has a relatively higher content of abietic-type rosin acids, such as gum rosin, and, thus, can be maleated or fumarated to a greater extent, or by using maleated or fumarated rosin that has been vacuum stripped to remove part of the unreacted rosin.

A higher softening point may also be obtained by replacing part of the maleated or fumarated rosin with a dicarboxylic acid such as adipic or isophthalic acid. The dicarboxylic acid may be any dicarboxylic acid of the general form:

HOOC—R$_4$—COOH, where R$_4$=C$_6$—C$_{12}$ alkylene, cycloalkylene or phenylene.

A wide range of polyols may be employed in the subsequent modification of the aminated modified rosin to provide the desired viscosity water soluble resin which possesses improved stability. All polyols tested have been shown to be effective. The polyols applicable to this invention include those with from 2 to 8 hydroxyl groups and exhibiting a molecular weight of from 62 to 600. Preferred polyols include diethylene glycol, triethylene glycol, tetraethylene glycol, glycerol, dipropylene glycol, 1,4-butanediol, pentaerythritol, sorbitol, and poly(ethylene glycol).

The resins of this invention may be used to prepare conventional water varnishes (based on the invention resin, water, NH$_4$OH, and a defoamer), pigment (based on the invention water varnish with a pigment) bases, and water-based inks (based on the invention pigment base, a wax, and an acrylic polymer).

The following examples serve to illustrate the water-soluble modified resins of the present invention:

EXAMPLE 1

To a 2000 milliliter flask equipped with a mechanical stirrer and nitrogen sparge were charged 1000 grams tall oil rosin, 2.6 grams tributyl phosphite, and one drop Dow-Corning antifoam A. The charge was heated to 170° C., and 186 grams fumaric acid was added. The charge was further heated to 200° C. and held at that temperature for one hour. Then 103 grams piperazine was added, and the charge was further heated to 235° C., where it was held until the acid number was 170. Next, the batch was cooled to 205° C., and 35 grams diethylene glycol was added. Heating was continued at 205° C. until the acid number was 154. The product was a clear resin with a ring-and-ball softening point of 137° C. Solutions of this resin at 25% solids in aqueous ammonia at pH 9 to 10 were stable, remained clear, and showed no precipitation for a period of nine weeks. By contrast, a similar resin without the diethylene glycol modification gelled in aqueous ammoniacal solution in two days.

EXAMPLE 2

A series of resins were prepared using the procedure of Example 1 but replacing the diethylene glycol with equimolar amounts of other polyols. These resins are listed in Table I. All of the polyol-modified resins made had solution stabilities of greater than 30 days, except those made with pentaerythritol or sorbitol. Even these latter resins had stabilities of over three weeks, which might be acceptable in some applications. Of particular interest, due to its high softening point, is the resin containing glycerol. A higher softening point usually correlates with faster drying speed, which is highly desirable in an ink resin. On the other hand, the resins modified with PEG 400 or PPG 425 had very low softening points, which allow ink formulations with greater film flexibility.

TABLE I

| | POLYOL-MODIFIED PIPERAZINE RESINS | | | | |
|---|---|---|---|---|---|
| Resin No. | Polyol | Acid No. | S.p. (°C.) | Visc.[a] | Stability[b] |
| 6412-30 | none | 187 | 138 | — | <1 |
| 6412-82 | DEG | 154 | 137 | G | >30 |
| 6488-17 | TEG | 155 | 137 | O-P | >30 |
| 6496-6 | Gly | 152 | 148 | W+ | >30 |
| 6496-10 | DPG | 152 | 142 | Y- | >30 |
| 6496-13 | 1,4-BD | 162 | 145 | U-V | >30 |
| 6496-20 | PEG200 | 159 | 132 | I | >30 |
| 6496-28 | PEG400 | 147 | 117 | R+[c] | >30 |
| 6496-29 | PPG425 | 146 | 120 | S- | >30 |
| 6496-50 | PE | 165 | 146 | U-V | 29 |
| 6496-53 | Sb | 150 | 146 | S+[c] | 27 |
| 6496-55 | TetEG | 165 | 136 | J | >30 |

[a]Gardner-Holt viscosity of a 25% solids solution in aqueous ammonia at a pH of 9.6 ± 0.1.
[b]Days standing at room temperature without gelling of a 25% solids solution in aqueous ammonia at a pH of 9.6 ± 0.1.
[c]Solution is slightly hazy.
Key: 1,4-BD = 1,4-butanediol; DEG = diethylene glycol; DPG = dipropylene glycol; PE = pentaerythritol; PEG200 = poly(ethylene glycol), 200 ave. molecular weight; PEG400 = poly(ethylene glycol), 400 ave. molecular weight; PPG425 = poly(propylene glycol), 425 ave. molecular weight; TEG = triethylene glycol; TetEG = tetraethylene glycol; Sb = sorbitol.

EXAMPLE 3

Table II shows the change in pH and viscosity of 25% aqueous ammonia solutions of the polyol-modified resins over 30 days. As can be seen, all of the solutions are quite stable with respect to viscosity. There is no obvious explanation for the small upward drift in pH for most of the solutions, but this behavior is not uncommon for aqueous solutions of maleic resins.

TABLE II

PROPERTIES OF AGED PIPERAZINE RESIN SOLUTIONS

| Resin No. | Polyol | Viscosity Initial | Viscosity 30 Days | pH Initial | pH 30 Days |
|---|---|---|---|---|---|
| 6488-17 | TEG | O-P | N-O | 9.56 | 9.83 |
| 6496-6 | Gly | W+ | W- | 9.52 | 9.81 |
| 6496-10 | DPG | Y- | Y+ | 9.58 | 9.88 |
| 6496-13 | 1,4-BD | U-V | U-V | 9.56 | 9.82 |
| 6496-20 | PEG200 | I | I-J | 9.58 | 9.60 |
| 6496-28 | PEG400 | R+ | S-T | 9.56 | 9.87 |
| 6496-29 | PPG425 | S- | S-T | 9.60 | 9.75 |
| 6496-55 | TetEG | J | J-K | 9.66 | 9.65 |

Key: See Table I.

It appears from the above data that a family of aqueous solution-stable ink vehicle resins with a range of softening points can be produced.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

We claim:

1. A water soluble resin comprising the reaction product of (a) a rosin modified sequentially by reaction first with a member of the group selected from fumaric acid, maleic acid, maleic anhydride, itaconic acid, and itaconic anhydride and, second, with a compound containing two secondary amine groups and (b) a polyol.

2. The resin of claim 1 wherein the secondary amine containing compound is of the general form:

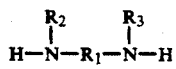

wherein $R_1$=alkylene and $R_2$ and $R_3$ are alkyl; or where $R_1$=alkylene, $R_2+R_3$=alkylene, and $R_1$, $R_2$, and $R_3$, together with the nitrogens to which they are bonded, form a nitrogen-containing heterocyclic ring system.

3. The resin of claim 1 wherein the modified rosin is derived from the group consisting of tall oil rosin, gum rosin, and wood rosin.

4. The resin of claim 1 wherein the secondary amine containing compound is selected from the group consisting of N,N'-dimethylethylene diamine and piperazine.

5. A water varnish comprising water, NH$_4$OH, a defoamer, and the resin of claim 1.

6. A pigment base comprising a pigment and the water varnish of claim 5.

7. An ink comprising an acrylic polymer, a wax, and the pigment base of claim 6.

8. The water soluble resin of claim 1 additionally comprising (c) a dicarboxylic acid of the general form:
HOOC—R$_4$—COOH
wherein $R_4$=$C_6$—$C_{12}$ alkylene, cycloalkylene or phenylene.

9. The resin of claim 8 wherein the secondary amine containing compound is of the general form:

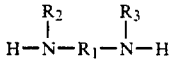

wherein $R_1$=alkylene and $R_2$ and $R_3$ are alkyl; or wherein $R_1$=alkylene, $R_2+R_3$=alkylene, and $R_1$, $R_2$, and $R_3$, together with the nitrogens to which they are bonded, form a nitrogen-containing heterocyclic ring system.

10. The resin of claim 8 wherein the modified rosin is derived from the group of rosins consisting of tall oil rosin, gum rosin, and wood rosin.

11. The resin of claim 8 wherein the secondary amine containing compound is selected from the group consisting of N,N'- dimethylethylene diamine and piperazine.

12. The resin of claim wherein the polyol is selected from the group consisting of diethylene glycol, triethylene glycol, glycerol, dipropylene glycol, 1,4-butanediol, poly(ethylene glycol), pentaerythritol, sorbitol, and tetraethylene glycol.

13. A water varnish comprising water, NH$_4$OH, a defoamer, and the resin of claim 8.

14. A pigment base comprising a pigment, a defoamer, water, and the water varnish of claim 13.

15. An ink comprising an acrylic polymer, a wax, and the pigment base of claim 14.

16. An improved method for preparing a water-soluble resin comprising reacting a rosin modified sequentially by reaction first with a member of the group selected from fumaric acid, maleic acid, maleic anhydride, itaconic acid, and itaconic anhydride and, second, with a compound containing two secondary amine groups, wherein the improvement comprises further reacting said sequentially modified rosin with a polyol.

17. The improved method of claim 16 wherein the secondary amine containing compound is of the general form:

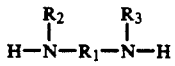

wherein $R_1$=alkylene and $R_2$ and $R_3$ are alkyl; or where $R_1$=alkylene, $R_2+R_3$=alkylene, and $R_1$, $R_2$, and $R_3$, together with the nitrogens to which they are bonded, form a nitrogen-containing heterocyclic ring system.

18. The improved method of claim 16 wherein the modified rosin is derived from the group consisting of tall oil rosin, gum rosin, and wood rosin.

19. The improved method of claim 16 wherein the secondary amine containing compound is selected from the group consisting of N,N'-dimethylethylene diamine and piperazine.

20. The improved method of claim 16 additionally comprising (c) a dicarboxylic acid of the general form:
HOOC—R$_4$—COOH wherein $R_4$=$C_6$-$C_{12}$ alkylene, cycloalkylene or phenylene.

21. The improved method of claim 20 wherein the secondary amine containing compound is of the general form:

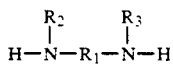

wherein $R_1$=alkylene and $R_2$ and $R_3$ are alkyl; or wherein $R_1$=alkylene, $R_2+R_3$=alkylene, and $R_1,R_2$, and $R_3$, together with the nitrogens to which they are bonded, form a nitrogen-containing heterocyclic ring system.

22. The improved method of claim 20 wherein the modified rosin is derived from the group of rosins consisting of tall oil rosin, gum rosin, and wood rosin.

23. The improved method of claim 20 wherein the secondary amine containing compound is selected from the group consisting of N,N'- dimethylethylene diamine and piperazine.

24. The improved method of claim 16 wherein the polyol is selected from the group consisting of diethylene glycol, triethylene glycol, glycerol, dipropylene glycol, 1,4-butanediol, poly(ethylene glycol), pentaerythritol, sorbitol, and tetraethylene glycol.

* * * * *

UNITED STATES PATENT AND TRADEMARK OFFICE
CERTIFICATE OF CORRECTION

PATENT NO.  : 5,152,832
DATED       : October 6, 1992
INVENTOR(S) : G. Frederick Hutter et al.

It is certified that errors appear in the above-identified patent and that said Letters Patent is hereby corrected as shown below:

In Claim 12, column 6, line 19, after claim, insert --1--.

Signed and Sealed this

Second Day of November, 1993

BRUCE LEHMAN

*Attest:*

*Attesting Officer*   Commissioner of Patents and Trademarks